United States Patent [19]

Toyoguchi et al.

[11] Patent Number: 4,592,039
[45] Date of Patent: May 27, 1986

[54] DISC PLAYER

[75] Inventors: Tsutomu Toyoguchi, Tokyo; Yoshiro Watanabe, Kanagawa, both of Japan

[73] Assignee: Sony Corporation, Tokyo, Japan

[21] Appl. No.: 664,850

[22] Filed: Oct. 25, 1984

[30] Foreign Application Priority Data

Oct. 27, 1983 [JP] Japan .................. 58-201586
Nov. 18, 1983 [JP] Japan .................. 58-217384
Dec. 26, 1983 [JP] Japan .................. 58-251875

[51] Int. Cl.⁴ .......................... G11B 1/00; G11B 17/04
[52] U.S. Cl. ................... 369/75.2; 369/77.1; 369/77.2
[58] Field of Search ............ 369/77.2, 77.1, 75.2

[56] References Cited

U.S. PATENT DOCUMENTS 4,098,510 7/1978 Suzuki et al. ............... 369/77.2
4,434,480 2/1984 Fukumitsu ............... 369/77.2
4,454,599 6/1984 Tsuchiya ............... 369/77.2
4,497,051 1/1985 Takahashi et al. ............... 369/77.1
4,507,768 3/1985 Ikedo et al. ............... 369/77.1
4,510,591 4/1985 Schatteman ............... 369/77.1

Primary Examiner—Steven L. Stephan
Attorney, Agent, or Firm—Lewis H. Eslinger; Alvin Sinderbrand

[57] ABSTRACT

A compact disc player is disclosed, in which in order to protect a disc from being dirtied and damaged upon unloading and loading, at least a pair of rollers for holding therebetween and transporting a disc inserted thereinto are each formed to be of such a taper-shape that the diameter of each roller is made small at the central portion thereof and is gradually increased therefrom to both side portions thereof, thus each roller being in contact only with the peripheral edge portion of the inserted disc.

11 Claims, 26 Drawing Figures

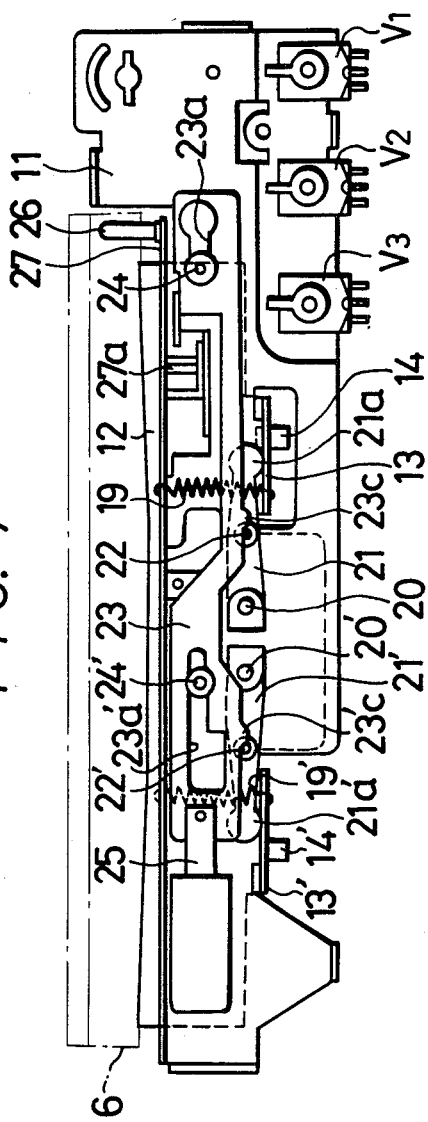
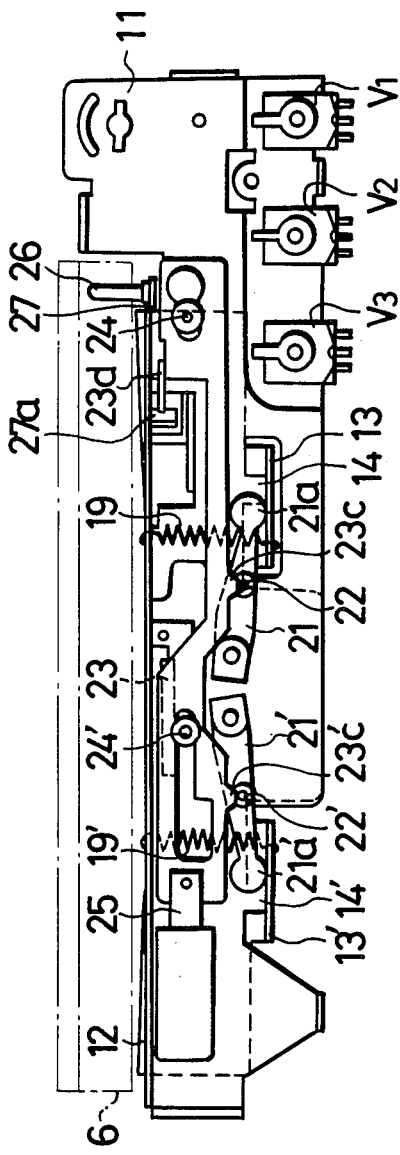
FIG. 7
FIG. 8

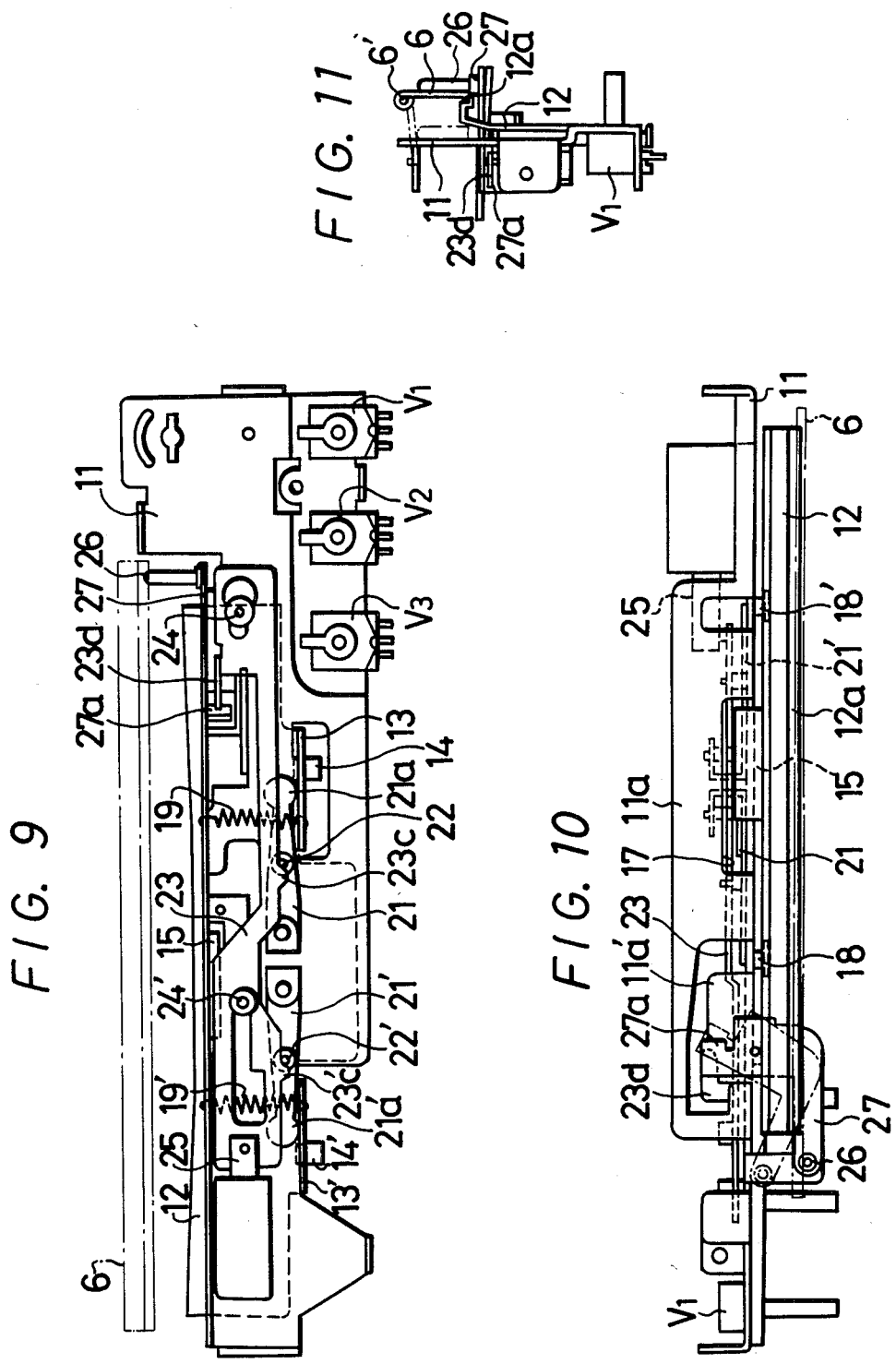

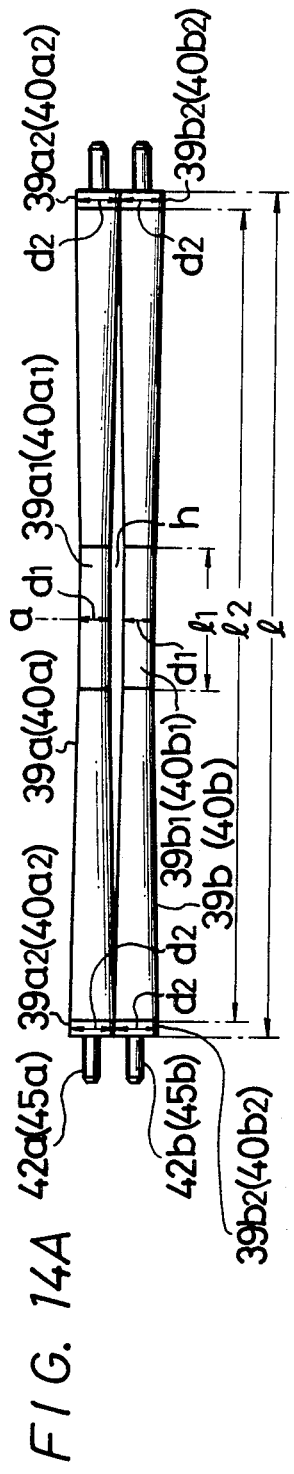
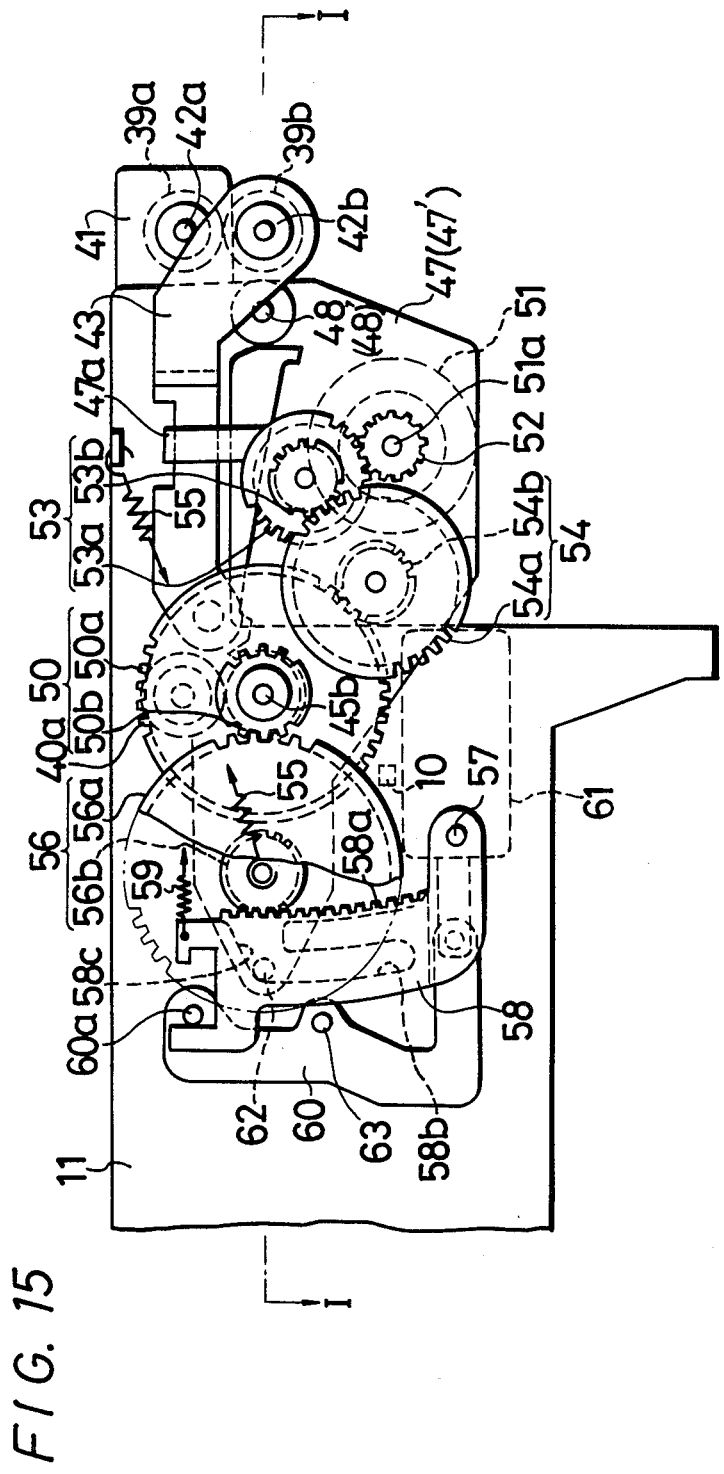
F I G. 14A
F I G. 15

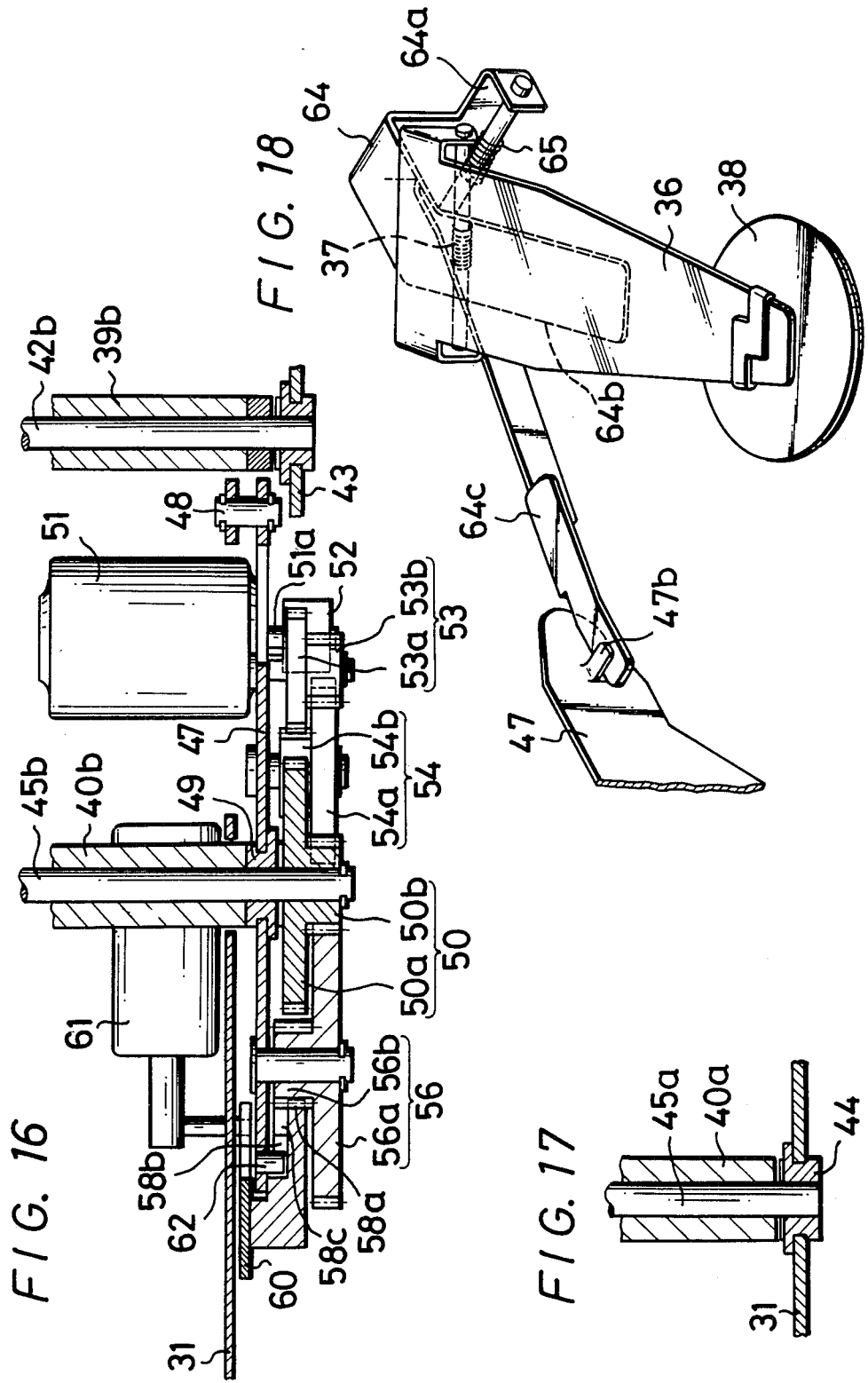

DISC PLAYER

BACKGROUND OF THE INVENTION

1. Field of the Invention

This invention relates to a disc reproducing apparatus and, in particular, is directed to a disc player for playing back a disc (a recording medium of a disc type) such as a digital audio disc and so on.

2. Description of the Prior Art

A disc loading system of a compact disc player (hereinafter referred to as CD player) is known as a built-in carrier type, in which a disc is located on a disc table of, for example, a drawer type and then loaded. The disc player of this type requires a spacing in front of the player proper to draw out the disc table and hence proposes a defect in the spacing. Particularly, when the CD player is installed within a vehicle and the like, there is then a problem of a protrusion within a small compartment of the vehicle. Thus it is desired that the CD player is formed as a slot-in system in which a disc is directly loaded thereinto. In this case, as the transporting mechanism for moving the disc, there have been proposed various mechanisms. However, any one of them has a defect of making the whole of the apparatus large in size so that the CD player can not be installed within the compartment.

Further, there is a defect that the disc is apt to be dirtied and damaged by the disc transporting mechanism.

Furthermore, in the prior art CD player of this kind, it is usual that the disc is taken out from a disc receptacle container and loaded onto the player. When the disc is taken out from the disc receptacle container, frequently, fingers directly touch the record surface of the disc and oil components such as finger prints and the like adhere thereto so that a light beam from an optical pickup device is disturbed by the oil components and hence a good playback becomes impossible.

Therefore, it may be considered that the disc is handled and loaded onto the disc player under being still incorporated into a jacket just like a floppy disc. However, in the disc player of the digital audio disc, it is necessary that in view of its construction, the disc is loaded onto the disc player under being taken out from the disc receptacle container, and such disc player can not adopt the construction such as the floppy disc.

OBJECTS AND SUMMARY OF THE INVENTION

It is an object of this invention to provide an improved disc player.

It is another object of this invention to provide a compact disc player of slot-in type, in which upon transportation of a disc, only the peripheral edge portion of the disc is held between a pair of tapered rollers in a linear symmetrical way and then transported, whereby to prevent the record surface of the disc from being dirtied and damaged.

It is a further object of this invention to provide a disc player having formed an openable and closable lid at the insertion opening portion for a disc to thereby prevent dusts from entering the inside of the disc player through the disc insertion opening and which can protect the disc from being damaged by the lid upon loading of the disc.

It is a yet further object of this invention to provide a disc player capable of loading thereonto a disc incorporated into a disc receptacle container and also capable of inserting or drawing the disc from its disc receptacle container and in which upon inserting or drawing, the mouth portion of the receptacle container is enlarged in width by a disc insertion opening frame member so that the disc can be inserted into or drawn out from the disc receptacle container easily and smoothly.

According to one aspect of this invention, there is provided a disc player in which a disc inserted into an insertion opening formed at a front surface of a disc player is gripped by a pair of rollers disposed in the up and down direction and one of said pair of rollers is driven by a drive source to locate said disc on a disc table, characterized in that said pair of rollers are each formed such that a diameter thereof is made small at its central portion and becomes gradually large approaching to both side portions thereof.

The other objects, features and advantages of the present invention will become apparent from the following description taken in conjunction with the accompanying drawings through which the like references designate the same elements and parts.

BRIEF DESCRIPTION OF THE DRAWINGS

FIGS. 7 to 9 are respectively rear views illustrating an example of the operation states of lock and open and close control mechanical sections used in the disc player according to this invention;

FIG. 10 is a plan view thereof;

FIG. 11 is a side view thereof;

FIGS. 14A and 14B are respectively a front view and a plan view illustrating a roller mechanism section used in the embodiment of the disc player according to this invention;

FIG. 15 is a side view of an example of a drive mechanism section used in the same;

FIG. 16 is a cross-sectional view taken along a line I—I in FIG. 15;

FIG. 17 is a cross-sectional view illustrating part of a fixed roller portion of the invention;

FIG. 18 is a perspective view illustrating a chucking section of the invention;

DESCRIPTION OF THE PREFERRED EMBODIMENT

Before describing the present invention, a disc receptacle container having incorporated therein a disc which is loaded onto a disc player of this invention will nafter be described with reference to FIGS. 1A to 1E.

Figure 1A:
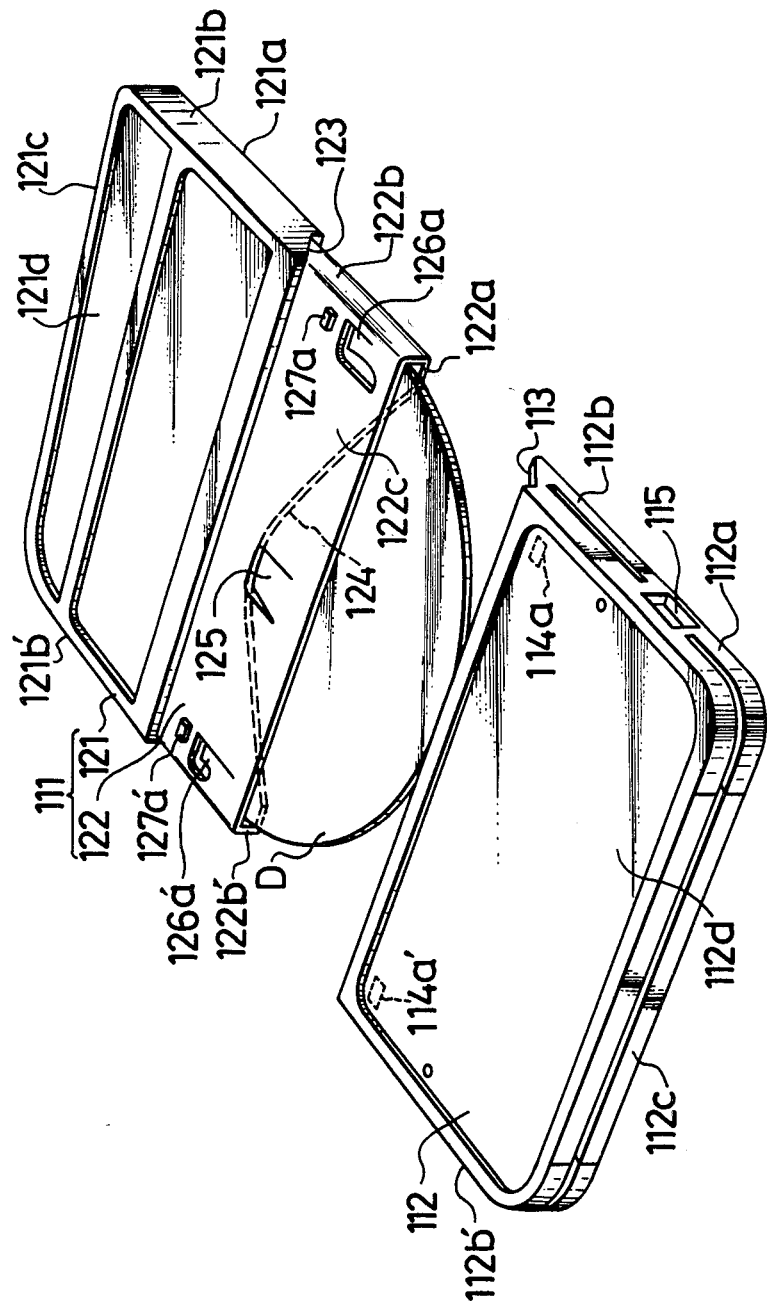
FIG. 1A is a perspective view of an example of a disc receptacle container having incorporated therein a disc which is loaded onto a disc player of this invention, in which case a lid of the disc receptacle container is removed therefrom.
Figure 1B:
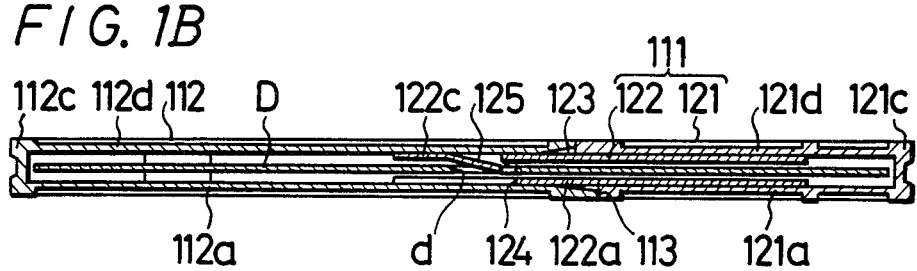
FIG. 1B is a longitudinally cross-sectional view of FIG. 1A along its center line under the state that the lid of the disc receptacle container is closed.
Figure 1C:
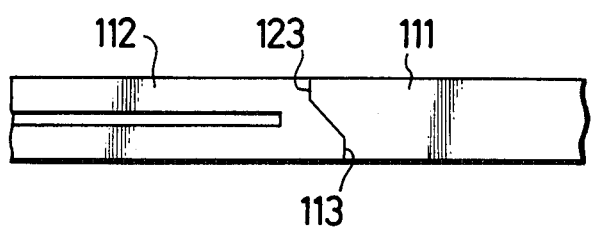
FIG. 1C is an enlarged side view of a part thereof.
Figure 1D:
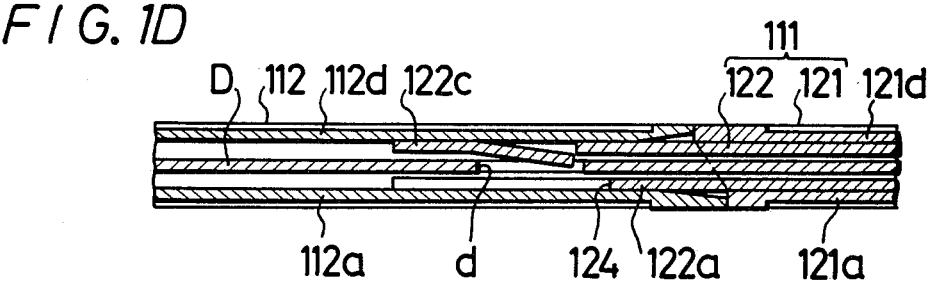
FIG. 1D is a longitudinally enlarged cross-sectional view of the central portion thereof.
Figure 1E:
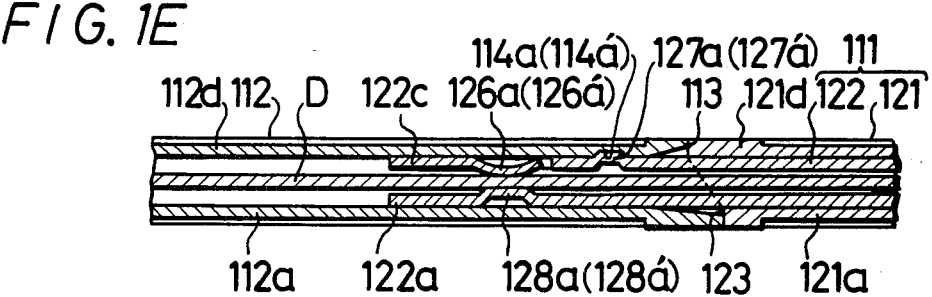
FIG. 1E is a longitudinally enlarged cross-sectional view of the side portion thereof.

FIG. 1A schematically illustrates the disc receptacle container under the state that a disc receptacle casing (hereinafter simply referred to as a casing) 111 and a lid 112 are separated from each other. The casing 111 can incorporate therein a disc D up to its portion a little larger than its semicircle and the lid 112 can cover the portion of disc D protruded from the casing 111 and can be engaged with the front edge portion of the casing 111. That is, the casing 111 consists of an outer casing 121 formed of a bottom plate 121a, two side wall plates 121b, 121b', a rear wall plate 121c and an upper plate 121d and an inner casing 122 formed of a bottom plate 122a, two side wall plates 122b, 122b' and an upper plate 122c. In this case, the inner casing 122 is made of a resilient material to have a width a little larger than the diameter of the disc D and inserted at its rear half portion into the outer casing 121 and fixed thereto. Engaged into the front half portion of the inner casing 122 protruded from the outer casing 121 is the lid 112 which consists of a bottom plate 112a, two side wall plates 112b, 112b', a front wall plate 112c and an upper plate 112d.

At the front edge portion of the outer casing 121 of this casing 111, the front edge portion of the bottom plate 121a is retreated from the front edge portion of the upper plate 121d to form a stepped portion and the front edge portions of the both side wall plates 121b, 121b' are sloped to communicate with the stepped portions whereby to form an erroneous insertion preventing stepped portion 123. In correspondence with the stepped portion 123, stepped portions 113 are formed at the rear edge portion of the lid 112. In the front half portion of the bottom plate 122a of the inner casing 122 is formed a cut-out concave portion 124 which is returned from its front edge portion and in its length direction so as to expose at least a central aperture d of the disc D. At substantially the central portion of the front half portion of the upper plate 122c is cut out and formed an engaging piece member 125 which is engaged with the central aperture d of the disc D in the direction in which the disc D is ejected. Formed at both sides of the upper plate 122c are hold members 126a, 126a' for the disc D which are inwardly biased with elasticity and engaging convex portions 127a, 127a' which are engaged with engaging concave portions 114a, 114a' formed on the inner surface of the upper plate 112d of the lid 112. The engaging convex portions 127a, 127a' are also used for the engagement with an insertion aperture portion of a player which will be described later. Further, formed on the inner surface of the bottom plate 122a are positioning convex portions 128a, 128a' of the disc D in correspondence with the hold members 126a, 126a' formed on the upper plate 122c.

In addition, engaging concave portions 115 are formed on the both side wall plates 112b, 112b' of the lid 112 to remove the lid 112 from the casing 111.

Figure 2:
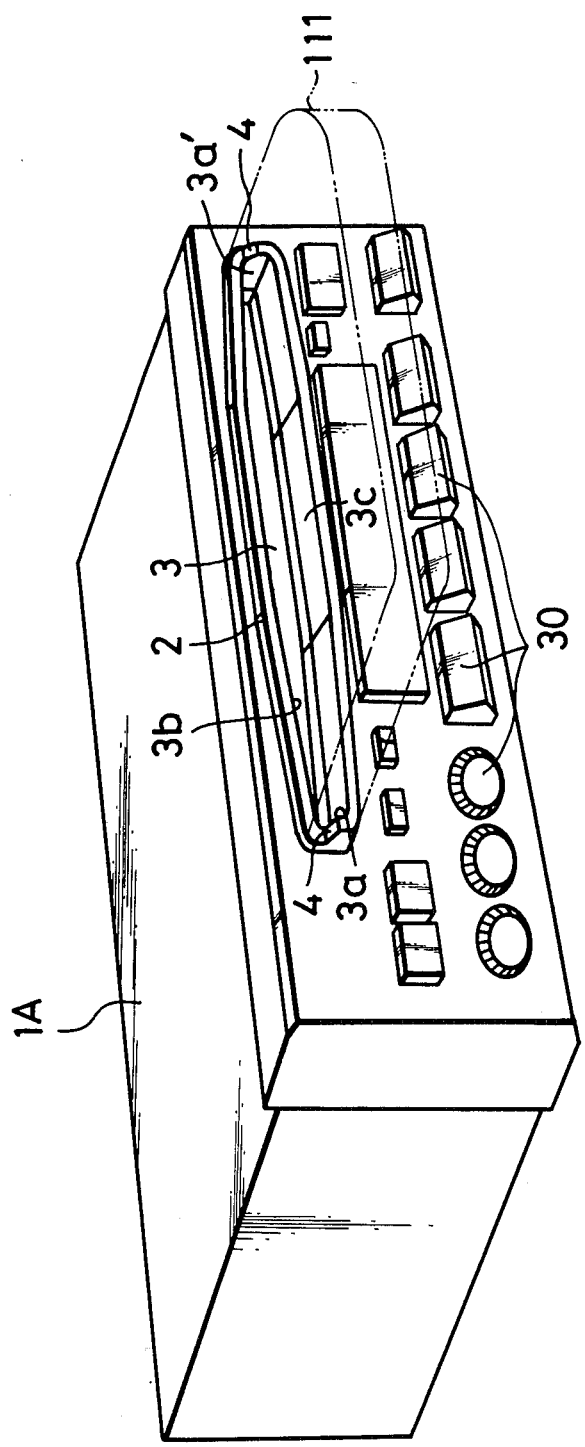
FIG. 2 is a perspective view showing an appearance of an embodiment of a disc player according to this invention.

FIG. 2 is a perspective view schematically illustrating an embodiment of the disc player according to this invention, which is installed on, for example, a car or the like and plays back a digital audio disc. Reference numeral 1A generally designates this disc player. This disc player 1A is of a slot-in type to load thereonto the disc D and has an insertion opening frame member 2 which is engaged with the insertion opening portion of the disc D. This insertion opening frame member 2 has an inner aperture 3 which is larger than the height of the afore-mentioned disc receptacle container and enlarged in the up and down direction, namely, elliptic or polygonal shape. The inner peripheral surface thereof is tapered so as to be inwardly narrowed and both inner side surfaces 3a, 3a' thereof are tapered to have inclination angles larger than those of upper and lower inner surfaces 3b, 3c thereof to make the width of the opening at the rear portion thereof smaller than that of the disc receptacle container. In the front surface side of the insertion opening frame member 2, the lower edge end surface thereof is protruded relative to the upper edge end surface thereof and the both side edge end surface thereof and the both side edge end surfaces thereof are sloped, whereby to form an erroneous insertion preventing stepped portions 4.

Figure 4:
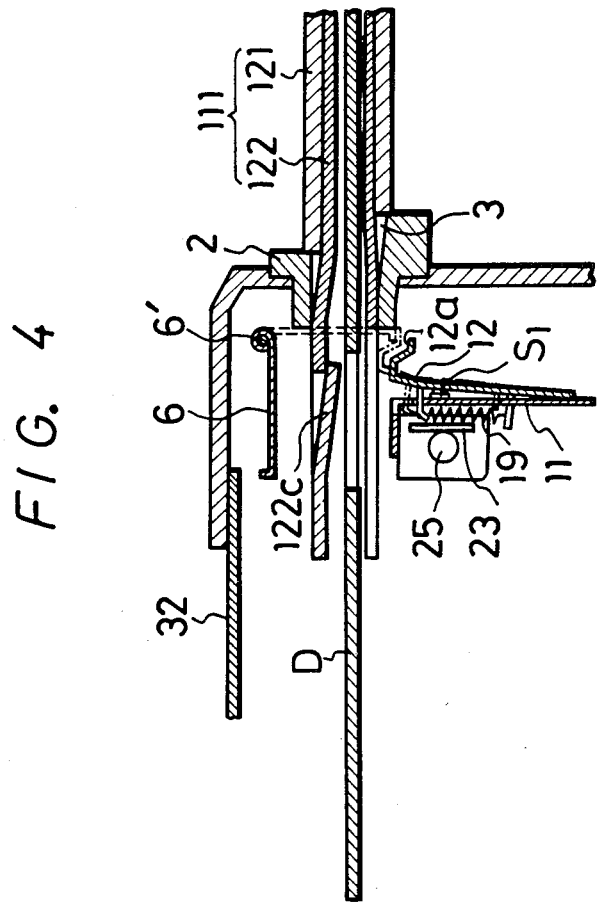
FIG. 4 is a partially enlarged longitudinal cross-sectional side view thereof in which a disc is inserted thereinto.
Figure 3:
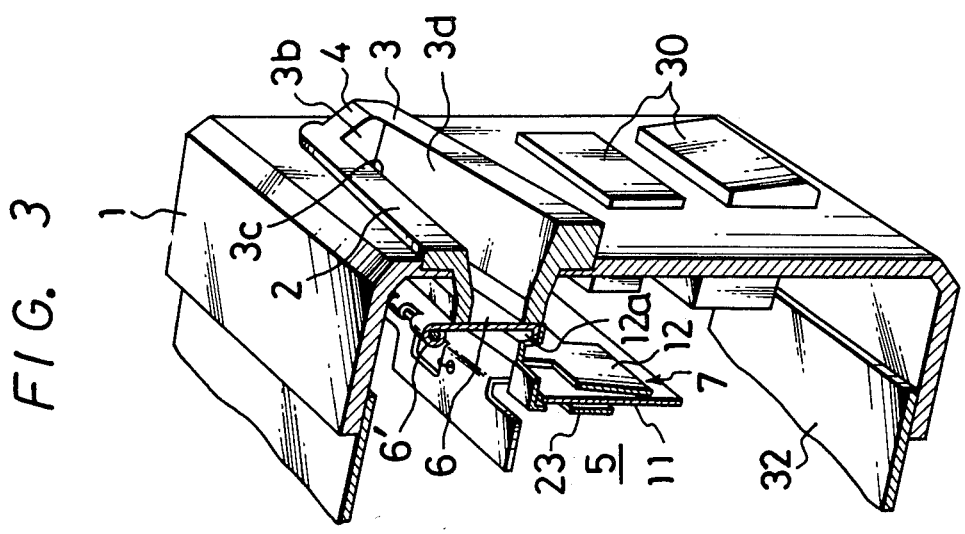
FIG. 3 is an enlarged cross-sectional perspective view of a main part thereof.

As shown in FIGS. 3 and 4, at the rear side of this insertion opening frame member 2, is provided a lid openable and closable apparatus 5. This apparatus 5 consists of an openable and closable lid 6, a lock mechanism 7 for locking and controlling the open and close of this openable and closable lid 6 and an open and close control mechanism 8. The openable and closable lid 6 is rotatably supported at its upper edge side to a shaft 6' which is extended along the rear portion of the insertion opening frame member 3. Disposed on the lower edge side of the openable and closable lid 6 are the lock mechanism 7 and the open and close control mechanism 8 which are made of relating members.

The construction of the lock mechanism 7 and the open and close control mechanism 8 will be described more fully also with reference to FIGS. 7 to 12.

At the front surface side of a base plate 11 which is fixed to a chassis 10 (refer to FIG. 4), there is provided a lock plate 12 the upper edge end surface of which is curved to be concaved and which has formed on its upper edge front surface side an engaging stepped portion 12a with which the lower edge portion of the openable and closable lid 6 is engaged in the rearward direction. This lock plate 12 is provided at its both side portions of the lower edge with engaging piece members 13, 13', each of which is bent backwards in the horizontal direction. Through the bent portions of these engaging piece members 13, 13' are formed rectangular apertures 13a, 13a' which are engaged with protruded piece members 14, 14' protruded downwards from the base plate 11. At substantially central portion of the upper portion of the lock plate 12 is formed an engaging piece member 15 which is bent and extended in the backward direction. Across this engaging piece member 15, through the lock plate 12, there are formed openings 16, 16', each of which is extended to be long in the up and down direction. The engaging piece member 15 is inserted into a window aperture 17 which is formed at the upper central portion of the base plate 11 and the openings 16, 16' are respectively engaged with receiving protrusions 18, 18' which are protruded at the front surface of the base plate 11. Between apertures 13b, 13b' bored through the engaging piece members 13, 13' and apertures 11b, 11b' bored through an upper edge bent portion 11a of the base plate 11 are respectively stretched tension coil springs 19, 19' by which the lock plate 12 is slidably biased upward relative to the base plate 11 and inclinedly biased forward with the lower edge engaging portion as the fulcrum while maintaining the engaged states of the engaging piece member 15 with the window aperture 17 and of the apertures 16, 16' with the receiving protrusions 18, 18'.

Contacted with the upper surface sides of the engaging piece members 13, 13' of the lock plate 12 are free end portions 21a, 21a' of levers 21, 21' which are symmetrically pivoted by axial pins 20, 20' so as to be swinging at the rear surface of the base plate 11 in the up and down direction. Engaging pins 22, 22' are respectively pivoted to the levers 21, 21' at their intermediate portions and the engaging protrusions 22, 22' are slidably in contact with the lower edge of an operation plate 23 which is disposed at the rear surface side of the base plate 11.

Bored through both right and left side portions of the operation plate 23 are rectangular openings 23a, 23a' which are respectively extended in the lateral direction. These rectangular openings 23a, 23a' are respectively engaged with rollers 24, 24' which are pivoted on the rear surface of the base plate 11 so as to be slidable in the lateral direction. Protruded portions 23c, 23c' are respectively formed on lower edge portions 23b, 23b' of the operation plate 23 at the positions corresponding to the engaging pins 22, 22' of the swing levers 21, 21'. The operation plate 23 is coupled to a player 25 and slid by the movement of the player 25 so that the protruded portions 23c, 23c' push the engaging pins 22, 22' of the swing levers 21, 21' to ride thereon to thereby swing the swing levers 21, 21' in the lower direction.

Formed beneath one side of the upper edge bent portion 11a of the base plate 11 is an intermediate bent portion 11a' on which an axial pin 11c is planted. Pivotably supported on this axial pin 11c is a lid opening lever 27 of nearly L-shape having planted thereon a lid opening shaft 26 such that the lid opening lever 27 becomes rotatable with the lid opening shaft 26 being positioned in front of the openable and closable lid 6. When a contact piece member 27a which is bent downward and formed on the rear end portion of this lever 27 is made in contact with a pushing piece member 23d formed on the operation plate 23 and the lever 27 is rotated backward by the sliding movement of the operation plate 23, the lid opening shaft 26 pushes upwards the openable and closable lid 6 to be opened, thus the open and close control mechanism 8 being constructed. In addition, operation volumes $V_1$, $V_2$ and $V_3$ are respectively mounted on the base plate 11.

Figure 13:
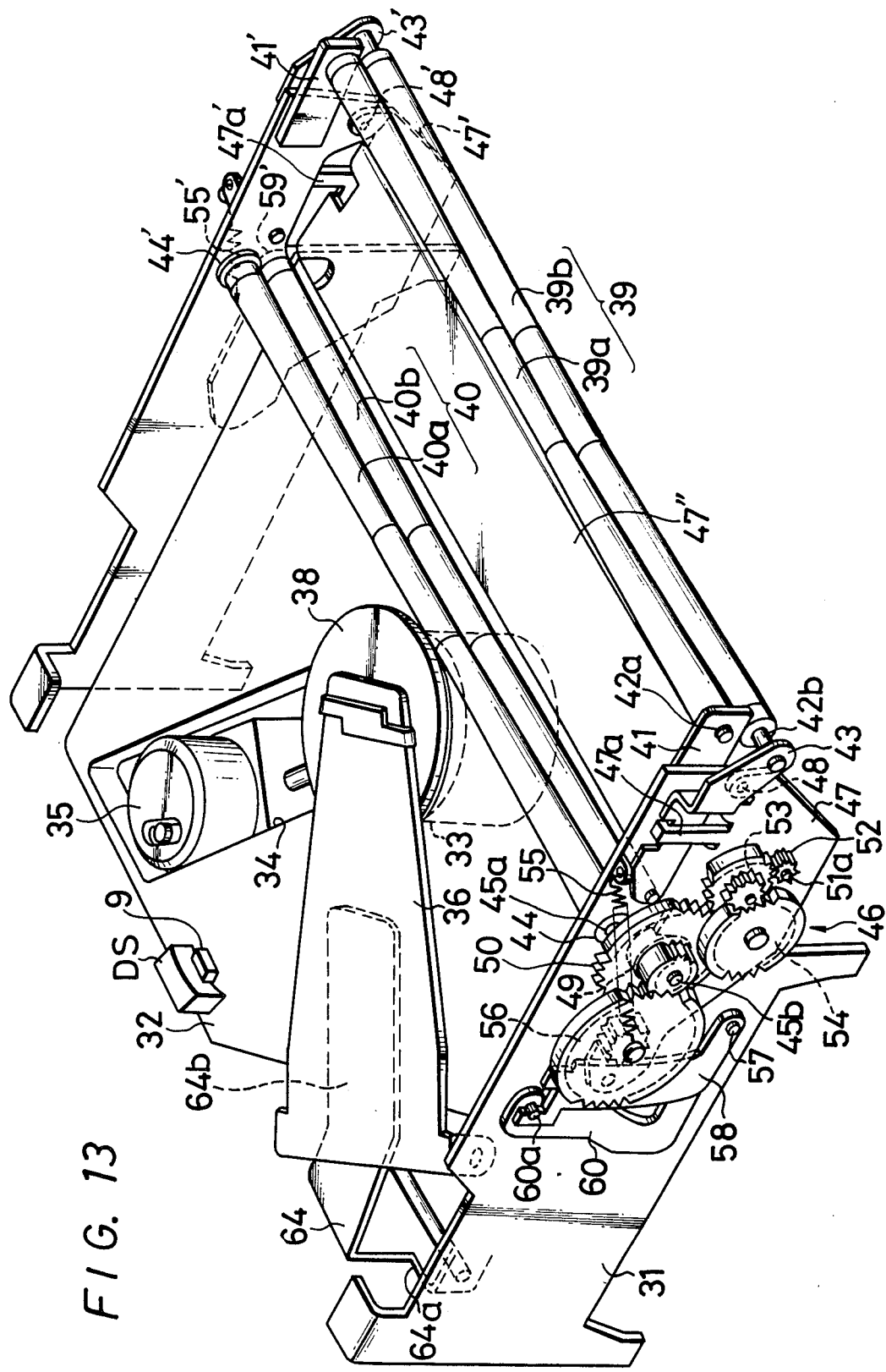
FIG. 13 is a perspective view of an example of a disc player mechanism used in the disc player of this invention.

A loading apparatus as shown in FIG. 13 will be described next with reference to FIGS. 14A, 14B to FIG. 18.

In the figures, reference numeral 31 designates a frame which is installed within a casing 1 (refer to FIG. 3) and a chassis 32 is horizontally fixed to the frame 31. A spindle motor 33 is mounted on the chassis 32 at its central portion and a slit or groove 34 is formed through the chassis 32 from nearly one corner portion at the rear side of the chassis 32 to the central direction, namely, to the direction of the spindle motor 33. Then, an optical pick-up device 35 is moved along the groove 34. A chucking arm 36 is rotatably supported on the chassis 32 at its other corner portion of the rear side and this chucking arm 36 is always biased in the direction of the spindle motor 33 by a coil spring 37. Attached to the tip end portion of this chucking arm 36 is a chucking disk plate 38 to be freely rotatable in correspondence with the spindle motor 33. At the front edge side of the chassis 32, there are respectively mounted a guide roller mechanism 39 and a drive roller mechanism 40 with a predetermined distance therebetween in the front and rear direction for loading the disc D.

The guide roller mechanism 39 positioned at the front side consists of a fixed guide roller 39a and a movable roller 39b. The fixed guide roller 39a is pivoted through a shaft 42a to bearings 41, 41' which are respectively fixed to the tip ends of the frame 31. While, the movable guide roller 39 is rotatably pivoted through a shaft 42b to the tip ends of arms 43, 43' which are pivoted to the frame 31 to be rotatable in the up and down direction and which are always rotatably biased upward by a spring or the like. The both guide rollers 39a, 39b are opposed to each other in the up and down direction while being separable. The drive roller mechanism 40, which is opposedly disposed with a predetermined spacing behind the guide roller mechanism 39 constructed as described above, consists of a fixed roller 40a and a drive roller 40b. The fixed roller 40a is pivoted through a shaft 45a to bearings 44, 44' fixed to the frame 31, while the drive roller 40b is supported and rotated by a roller drive mechanism 46 which is moved in the up and down direction relative to the frame 31 and moved to be separable from the fixed roller 40a. Each of the rollers 39a, 39b and 40a, 40b used in the guide roller mechanism 39 and the drive roller mechanism 40 is formed such that the diameter thereof is small at the central portion, gradually increased to the direction of both side portions and is made the same at both end portions.

Figure 14B:
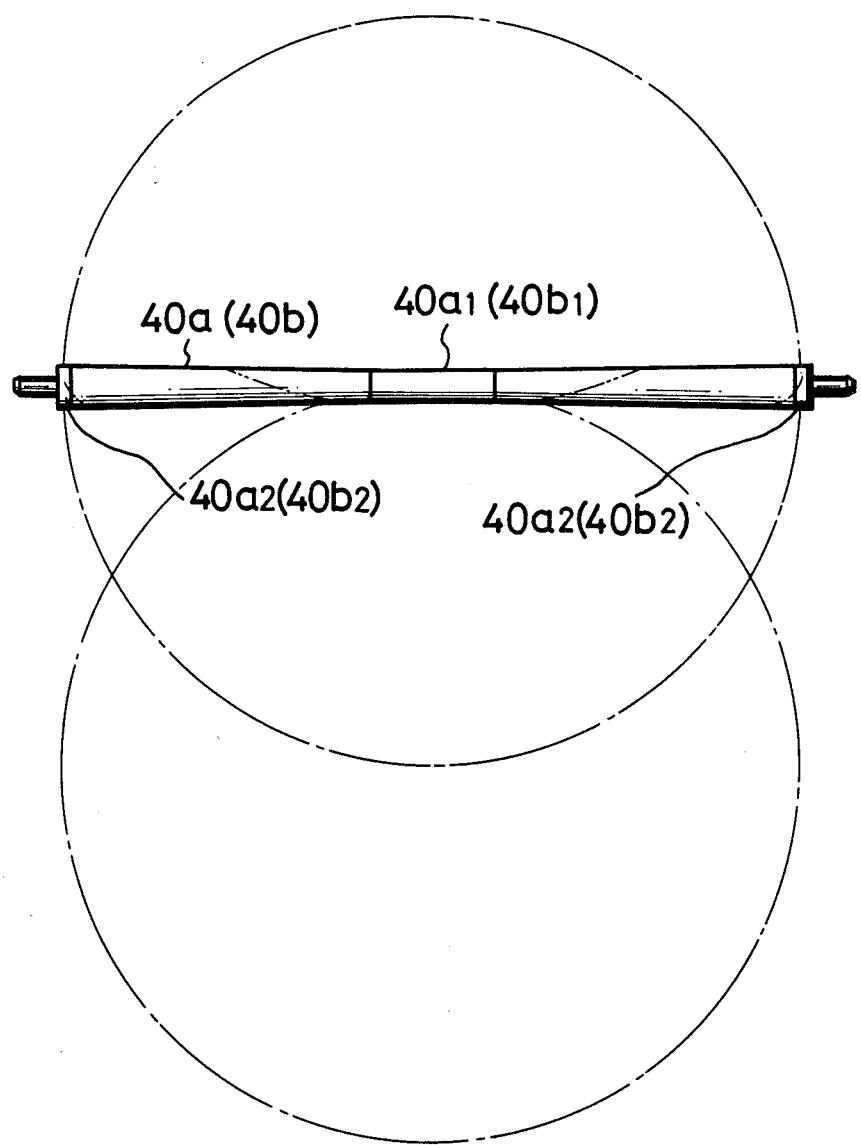

More specifically, as shown in FIGS. 14A and 14B, each of the rollers 39a, 39b and 40a, 40b should be formed on the following conditions of each diameter of their central portions $39_{a1}$, $39_{b1}$ and $40_{a1}$, $40_{b1}$ is taken as a diameter $d_1$ and each diameter of their both end portions $39_{a2}$, $39_{b2}$ and $40_{a2}$, $40_{b2}$ is taken as $d_2$, a condition $d_1 < d_2$ must be satisfied; if the full length of each roller is taken as l, the length of the central portion thereof is taken as $l_1$ and the length between the inner sides of both end portions is taken as $l_2$, a condition of $1 \geq l_2 > l_1 \geq 0$ must be satisfied; the both side portions of each roller must be symmetrical to a feeding center a; and if the thickness of the disc D is taken as t, a condition of $d_2 - d_1 \geq \frac{1}{2}t$ must be satisfied.

When the rollers 39a, 39b and 40a, 40b thus formed are respectively in contact with one another, a distance h is established at the central portion thereof and hence a gap which becomes narrower from the distance portion to the both side directions just like being tapered is formed therebetween. The surface portion of each of the rollers 39a, 39b and 40a, 40b is made of proper resilient material such as rubber, soft plastic material and the like, and the shafts 42a, 42b and 45a are formed integral with the rollers 39a, 39b and 40a or bonded thereto so as to be rotated together. However, the shaft 45b is formed independently from the roller 40b and contacts with the roller 40b with an approximate friction relation so that if an excessive load is applied thereto, the shaft 45b is rotated but the roller 40b is not rotated.

The roller drive mechanism 46 will be described with reference to FIG. 15.

In FIG. 15, reference numerals 47, 47' designate support plates which are pivoted to the frame 31 at both side surfaces of the front portion thereof by axial pins 48, 48' so as to be rotatable in the up and down direction. These support plates 47, 47' are coupled together by a connection plate 47" and bearings 39, 39' are respectively fixed to substantially the central portion of the both support plates 47, 47'. The both end portions of the drive rollers 40b are respectively passed through the bearings 39, 39' to be pivoted, and a gear 50 is fixed to one end side of this shaft 45b, namely, the protruded portion of the side pivoted to one support plate 47. This gear 50 is rotated in ganged with a gear 52 fixed to a shaft 51a of a motor 51 mounted to the support plate 47 and intermediate gears 53, 54 pivoted to the support plate 47, whereby the drive force of the motor 51 is transmitted to the drive roller 40b. That is, the gear 50 fixed to the drive roller 40b (hereinafter simply referred to as the drive gear 50) and the intermediate gears 53, 54 respectively include large diameter tooth portions 50, 53a and 54a and small diameter tooth portions 50b, 53b and 54b, and the gear 52 attached to the shaft 51a of the motor 51 is engaged with the large diameter tooth portion 53a of the first intermediate gear 53. Then, the small diameter tooth portion 53b of this first intermediate gear 53 is engaged with the large diameter tooth portion 54a of the second intermediate gear 54 and the small diameter tooth portion 54b of this second intermediate gear 54 is engaged with the large diameter tooth portion 50a of the drive gear 50 so that the drive force is transmitted to the drive roller 40b as described above. The support plates 47, 47' are always rotatably biased upwards by springs 55, 55' to urge the drive roller 40b to contact with the fixed roller 40a. Rotatably supported at the tip end of one support plate 47 is a support plate rotating gear (hereinafter referred to as the rotating gear) 56. This rotating gear 56 also includes a large diameter tooth portion 56a and a small diameter tooth portion 56b. The large diameter tooth portion 56a is engaged with the small diameter tooth portion 50b of the drive gear 50, while the small diameter tooth portion 56b thereof is engaged with a rack member 58a of a segment gear arm 58 which is rotatably supported to the frame 31 by an axial pin 57. This segment gear arm 58 is rotatably biased by a spring 59 in the direction of the small diameter tooth portion 56b of the rotating gear 56. Engaged with this segment gear arm 58 is a pin 60a protruded on one end portion of a planger arm 60 which is rotatably pivoted to the frame 31 at its central supporting point 63. The other end of the panger arm 60 is coupled to a planger 61. Formed on the inner surface side of the segment gear arm 58 is a groove 58b which is extended substantially in parallel to the rack member 58a. Formed from the upper portion of this groove 58b is a guide groove 58c which is widely opened to the direction of the rack member 58a, while protruded on the tip end surface of the support plate 47 is an engaging pin 62 which is slidably engaged from the guide groove 58c to the groove 58b. On the both support plates 47, 47' formed are engaging piece members 47a, 47a' which are respectively engaged with the upper edge sides of arms 43, 43' to which the movable guide roller 39b is rotatably supported. The arms 43, 43' are always rotatably biased upwards by springs and the like so that the upper edge sides thereof are engaged with the engaging piece members 47a, 47a' thereby rotatably moved downwards in association with the downward rotation of the support plates 47, 47'. In this case, the arms 43, 43' can be rotatably moved downward independently from the support plates 47, 47'. Under the condition that the support plates 47, 47' are rotatably moved upwards, the arms 43, 43' are respectively positioned upwards to urge the movable guide roller 39b to contact with the fixed guide roller 39a.

As shown in FIG. 18, protruded on the inner surface of the tip end portion of one support plate 47 is an engaging piece member 47b and this engaging piece member 47b is engaged with other portion 64c of a coupling arm 64 which consists of an intermediate portion 64a pivoted to the frame 31 and one end portion 64b engaged with the lower surface of the chucking arm 36. Reference numeral 65 designates a spring which rotatably biases the coupling arm 64 so as to prevent the chucking arm 36 from being rotated in the direction of the spindle motor 33 by the spring 37 which rotatably biases the chucking arm 36.

Reference DS as shown in FIG. 13 designates a disc stopper and when the disc D is horizontally inserted, the disc D comes into contact with this disc stopper DS whereby the insertion position of the disc D is determined.

Figure 20:
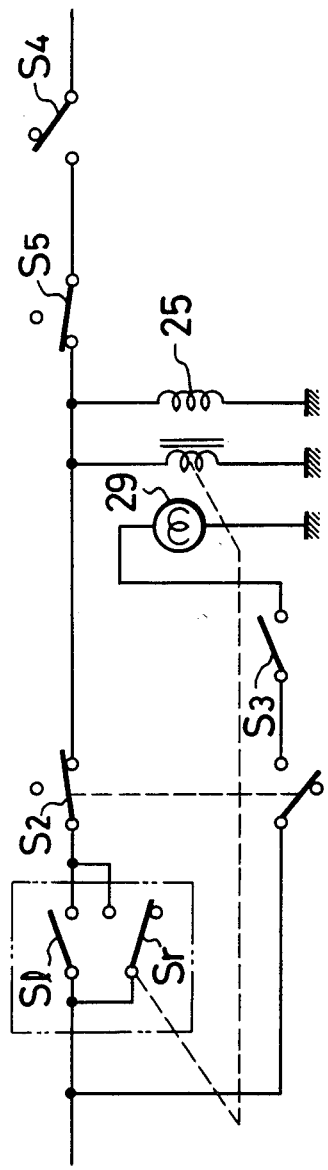
FIG. 20 is a connection diagram showing an electric circuit which is used in this invention.

An example of the electric circuit for operating the lock mechanism 7, the open and close control mechanism 8, the loading mechanism, the disc clamp arm and the like in association with one another is constructed as, for example, shown in FIG. 20. In FIG. 20, a leaf switch S1 of the planger 25, which operates the lock mechanism 7 and the open and close control mechanism 8 when the disc D is inserted is provided at the front surface of the base plate 11. A relay switch Sr is connected in parallel to this leaf switch S1 and the operation piece member of the leaf switch S1 is made corresponding to the lock plate 12. Connected in series between the leaf switch S1 and the planger 25 are a switch S2 controlled by an optical switch 9 which detects the operation of the disc loading mechanism as will be described later and a switch S3 constructing a switch 10 which detects the clamping state of the disc D on the disc table as will be described later. Connected to a connection point of the clamping state detection switch S3 is an alarm circuit 29, for example, an alarm lamp circuit or an alarm buzzer circuit. To the circuit of the planger 25 is connected an eject switch S4 through a switch S5 which is logically controlled in cooperation with optical switches 8a, 8b which are respectively turned off when the horizontal unloading of the disc D is completed as will be described later.

In FIGS. 2 and 3, reference numeral 30 designates an operation member of the disc player 1A.

The operation for loading the disc D, which is incorporated in the disc receptacle container, onto the disc player thus constructed will be described next.

Under the state that the disc D is accommodated in the disc receptacle container, the disc D is inserted into the inner casing 122 of the casing 111, its central aperture d is exposed through the cut-out concave portion 124 and engaged with the engaging piece member 125 in the eject direction. And, the both side portions of the disc D are respectively gripped by the pushing piece members 126a, 126a' and the positioning convex portions 128a, 128a', thus the disc D being positioned under the state that the peripheral edge thereof is remote from the inner surfaces of the both side wall plates 122b, 122b' of the inner casing 122. Accordingly, the disc D is held in the casing 111 under the state that the disc D is prevented from being taken out from the casing 111 and being shaken therein. Under this state, the lid 112 is engaged with the casing 111. To be more concrete, the lid 112 is engaged with the inner casing 122 at its front half portion protruded from the outer casing 121 whereby the engaging concave portions 114a, 114a' of the lid 112 are respectively engaged with the engaging convex portions 127a, 127a' of the inner casing 122 and the stepped portion 113 of the rear edge portion of the lid 112 is made in engaged contact with the erroneous insertion preventing stepped portion 123 of the outer casing 121.

Figure 5:
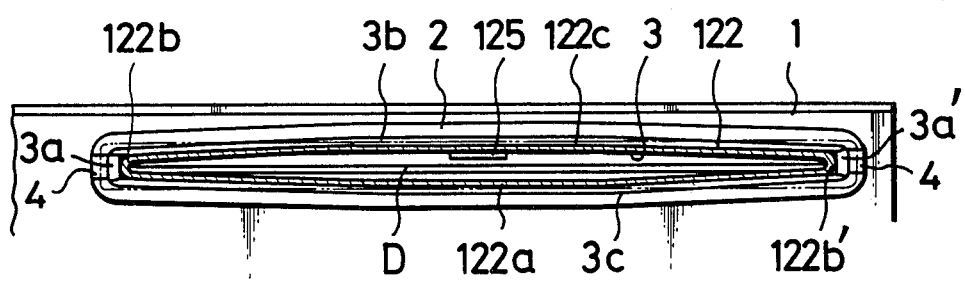
FIG. 5 is a longitudinally cross-sectional front view thereof.
Figure 6:
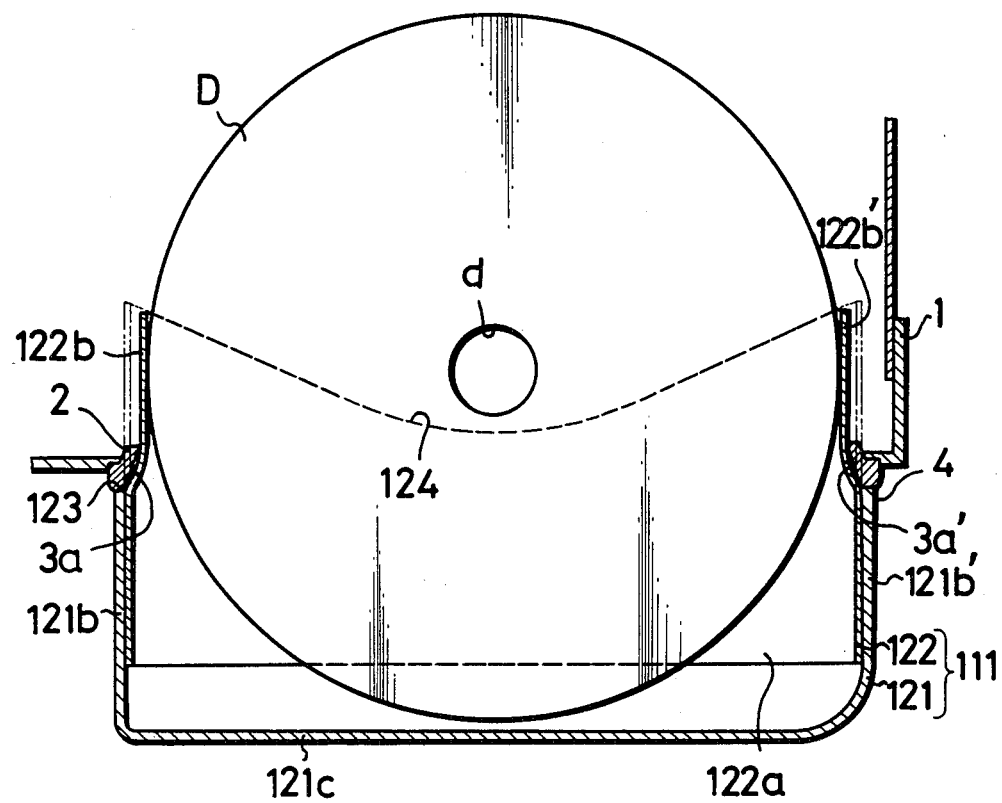
FIG. 6 is a cross-sectional front view thereof.
Figure 12:
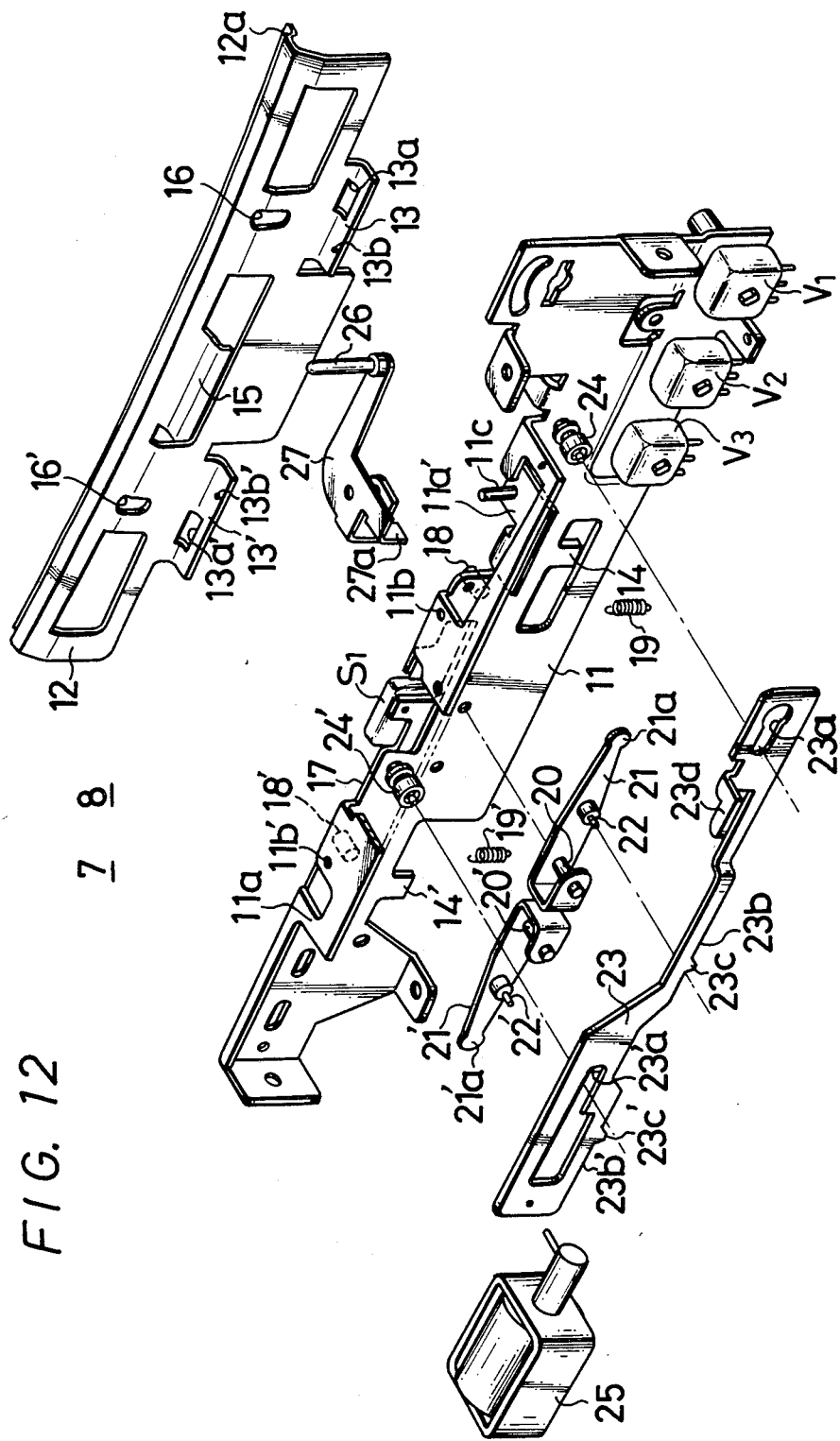
FIG. 12 is an exploded perspective view thereof.

When the disc D incorporated into the disc respectacle container as described above is loaded onto the disc player 1A, the lid 112 is removed from the casing 111, a part of the disc D is protruded from the front edge of the casing 111, namely the front edge of the inner casing 121, and then inserted into the insertion opening 2 of the player 1A. Then, the front edge end of the disc D is made in contact with the openable and closable lid 6 and pushes the same inwardly. As a result, the openable and closable lid 6 is rotated a little about the shaft supporting portion by the upper edge shaft 6', and in association with the rotation of this lid 6, the lock plate 12 of the lock mechanism 8 engaged with the openable and closable lid 6 is swung toward the side of the base plate 11. When the lock plate 12 is swung in this way, the leaf switch Sl is made on to operate the plunger 25, whereby the operation plate 23 is slidably moved to ride the protruded portions 23c, 23c' of the lower edge portions 23b, 23b' on the engaging protrusions 22, 22' of the levers 21, 21', thus the both levers 21, 21' being swung downwards. When the both levers 21, 21' are swung downwards, the lock plate 12 is lowered through the lower edge engaging piece members 13, 13' against the biasing force of the coil springs 19, 19' so that the lock plate 12 is disengaged from the openable and closable lid 6 to allow the lid 6 to freely rotate to open and close (see FIG. 8). Thereafter, when the operation plate 23 is further slidably moved by the stroke of the planger 25, the pushing piece member 23d pushes the contact piece member 27a of the lid opening lever 27 to rotate the lid opening lever 27, whereby the lid opening shaft 26 which is planted on the tip end of the lid opening lever 27 pushes the openable and closable lid 6 at its front surface to rotate the same upwards (see FIG. 7). Thus, the insertion opening portion, namely, the inner opening portion 3 of the insertion opening frame member 2 is opened so that as shown in FIGS. 4, 5 and 6, not only the protruded portion of the disc D from the casing 111 becomes able to be inserted into the opening portion of this insertion opening frame member 2 but also the inner casing 122 becomes able to be inserted thereinto. However, since the central portion of the inner opening portion 3 of the insertion opening frame member 2 is enlarged larger than the height of the inner casing 122 and the rear opening portion thereof is made narrow in width, when the inner casing 122 is inserted into the insertion opening frame member 2, the inner casing 122 is pushed at its both sides by the both inner side surfaces 3a, 3a' of the inner opening portion 3 so that its upper plate 122c and bottom plate 122a are deformed to be enlarged in the up and down direction. In association therewith, the engaging piece member 125 formed on the upper plate 122c of the inner casing 122 is moved upwards and becomes remote from the central aperture d of the disc D, while the pushing piece members 126a, 126a' are slightly moved upwards, thus the pushing force thereof against the disc D being weakened.

Under this state, since the protruded portions 23c, 23c' of the operation plate 23 are respectively disengaged from the engaging protrusions 22, 22' of the levers 21, 21' and the levers 21, 21' are inhibited from being swung, the lock plate 12 is released from being pushed downward, raised by the biasing force of the springs 19, 19' and then returned forward. As a result, although the leaf switch Sl is turned off, the relay switch Sr which is connected in parallel to the leaf switch Sl remains in the on-state so that the planger 25 is operated to hold the openable and closable lid 6 in the opened state.

While, when the leaf switch Sl is made on and then the planger 61 is driven, the planger arm 60 is rotated and the segment gear arm 58 is rotated against the biasing force of the spring 59 in the direction to become remote from the support plate 47, whereby the engagement between the small diameter tooth portion 56b of the rotating gear 56 of the support plate 47 and the rack member 58a is broken and they are held in this state.

Figure 19A:
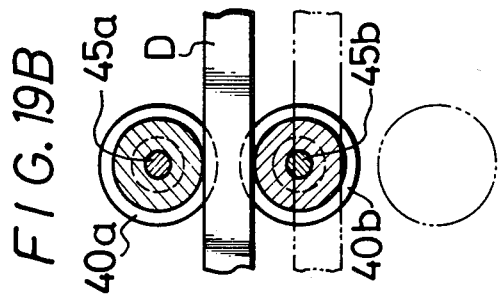
FIGS. 19A and 19B are respectively cross-sectional views used to explain the operation of the roller mechanism section.
Figure 19B:
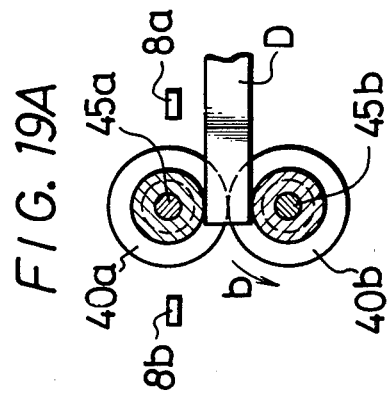

When the disc D is inserted and this disc D is made in contact with the rollers 39a, 39b of the guide roller mechanism 39, the movable guide roller 39b is moved downwards through the arm 43 to widen the spacing between the both rollers 39a, 39b so that the disc D is gripped by the both rollers 39a, 39b. Then, when the disc D passes through the guide roller mechanism 39 and arrives at the rollers 40a, 40b of the drive roller mechanism 40 (see FIG. 19A), an optical switch, namely, photo reflector 8a which is disposed in front of the drive roller 40a is turned on to allow the motor 51 to rotate in the positive direction. The drive force of this motor 51 is transmitted through the gear 52 fixed to the motor shaft 51a and the intermediate gears 53, 54 to the gear 50 fixed to the shaft 45b of the drive roller 40b, whereby the drive roller 40b is rotated in the direction in which the disc D sent forward (in the direction shown by an arrow b in FIG. 19A) so that under the state that the drive roller 40b is slightly moved downward against the biasing force of the spring 55 of the support plate 47, the disc D is gripped by the drive roller 40b and the fixed roller 40a and moved to a position at which the disc D comes into contact with the disc stopper DS (shown in FIG. 19B). Under this state, the tip end of the disc D is detected by an optical switch, namely, photo reflector 9 which is disposed in the deep end portion of the chassis 32 and hence the circuit of the planger 61 is turned off. As a result, the planger arm 60 is rotatably returned and the segment gear arm 58 is returned by the biasing force of the spring 59 so that its rack member 58a is engaged with the small diameter tooth portion 56b of the rotating gear 56.

Therefore, due to the rotation force transmitted from the drive roller gear 50 and the rotating gear 56, the support plate 47 begins to rotatably move downward around the axial pin 48 against the upward biasing force of the spring 55. During a period in which the support plate 47 is being rotatably moved downward, since the engaging protrusion 62 is engaged with the guide groove 58b, the segment gear arm 58 is prevented from being made remote from the small diameter tooth portion 56b. Further, since the engaging piece member 47b of the support plate 47 is made in contact with the other end portion 64c of the coupling arm 64 by the spring 65, the coupling arm 64 is rotatably moved downward as the support plate 47 is rotatably moved downward. Consequently, the chucking arm 36 is moved by the biasing force of the spring 37 to urge the chucking disk plate 38 mounted to the tip end portion thereof to correspond to the central portion of the disc D. In this case, the drive roller 40b, while continuing its rotation, is moved downward as the support plate 47 is rotatably moved downward and the guide roller 39b also is moved downward as the arm 43 is moved downward together with the support plate 47 through the engaging piece member 47a. Thus, the disc D is moved downward and located on a disc table (not shown) which is disposed on the spindle motor 33. In addition, the top end of a spindle shaft, which is formed as a truncated cone, is engaged into the central aperture d of the disc D and the central portion of the disc D is pushed by the chucking disk plate 18, thus ensuring the disc D to be held.

When the support plate 47 is rotated downward to the chucking operation completion position, an appropriate spacing is produced in the engagement portion between the chucking arm 36 and the other end portion 64c of the coupling arm 64 and the drive roller 40b and the movable guide roller 39b are rotatably lowered so as to become apart from the lower surface of the disc D, a loading completion switch 10 (see FIG. 15) is operated to stop the motor 51 from rotating.

As described above, under the loading completion state, the disc D is chucked on the disc table attached to the spindle motor 33 by the chucking disk plate 38 of the chucking arm 36 and the drive roller 40b and the movable guide roller 39b are lowered to be apart from the lower surface of the disc D, whereby the disc D is reproduced by the optical pickup device 35. Under this state, it is possible that the casing 111 is inserted into the insertion opening frame member 2 or that the casing 111 is taken out therefrom after the disc D is moved to the loading section.

When the disc D is ejected from its chucking state, the eject operation button is depressed to cause the motor 51 to be rotated in the reverse direction so that the operation opposite to the chucking operation for sending the disc D is carried out.

That is, when the motor 51 is rotated in the reverse direction, the drive roller 40b is rotated in the reverse direction and the rotating gear 56 attached to the support plate 47 is also rotated in the reverse direction. Then, the small diameter tooth portion 56b of the gear 56 is rotated in the reverse direction relative to the rack member 58a of the segment gear arm 58 so that the support plate 47 is rotatably moved upward around the shaft supporting portion. Accordingly, in association with this operation, the coupling arm 64 is released from the pushing-down force exerted by the engaging piece member 47b of the support plate 47 and is rotatably moved upwards by the biasing force of the spring 65. In consequence, the chucking arm 36 arises against the biasing force of the spring 37 at the shaft supporting portion and the chucking disc plate 38 is made apart from the upper surface of the disc D. On the other hand, the drive roller 40b is being rotated in the reverse direction and moved upward through the support plate 47 so as to push the disc D upward so that the disc D is again gripped by the drive roller 40b and the fixed roller 40a. Further, in this case, since the movable guide roller 39b of the guide roller mechanism 39 is released from being lowered by the arm 43 supported by the support plate 47, the movable guide roller 39b is moved upwards by the biasing force of the spring and contacts with the fixed guide roller 39a.

As described above, when the support plate 47 is rotatably moved upward to the predetermined position, the disc D is moved forward by the drive roller 40b and made apart from the switch 9 which is disposed in the deep end portion of the chassis 32, this switch 9 is turned on to operate the planger 61 and hence the planger arm 60 is rotated to thereby rotate the segment gear arm 58 against the biasing force of the spring 59 in the direction apart from the support plate 47 and thus the rack member 58a thereof being made apart from the small diameter tooth portion 56b of the rotating gear 56. As a result, the support plate 47 becomes free in rotation and the both support plates 47, 47' are integrally and rotatably moved upwards through the coupling plate 47" by the biasing force of the springs 55, 55' so that the disc D is perfectly gripped by the drive roller 40b and the fixed roller 40a. Thus, since the drive roller 40b is reversed in its rotation, the disc D is moved in the direction to the insertion opening 2 through the guide rollers 39a and 39b.

When the disc D is moved to the predetermined position, the motor 51 is turned off by the optical switch, namely, photoreflector 8b, in practice, by the logical outputs, those from the switches 8a and 8b, thus the movement of the disc D is stopped. At the same time, the planger 61 is made inoperative and the planger arm 60 is rotatably returned, whereby the segment gear arm 58 is rotated by the biasing force of the spring 59 in the direction to the support plate 47 and the rack member 58a is engaged with the small diameter tooth portion 56b of the rotating gear 56 and then returned to the original state.

In the above operation, when the support plate 47 is rotated upwards by the engagement between the small diameter tooth portion 58b of the rotating gear 56 and the rack member 58a of the segment gear arm 58, the pin 62 of the support plate 47 is slidably moved within the groove 58b of the segment gear arm 58 and so, under the state that the support plate 47 is rotatably moved up to the upper portion, the pin 62 is opposed to the guide groove 58c. Under this state, when the planger 61 is operated, the segment gear arm 58 is rotated through the planger arm 60 in the direction apart from the support plate 47, thus the engagement of the rack member 58a with the small diameter tooth portion 56b of the rotating gear 56 being released.

In this embodiment, since the guide roller mechanism 39 is used merely for keeping the posture of the disc D, this guide roller mechanism 39 can be replaced with a guide mechanism of other system such as a plate shape and so on with similar action and effect being achieved.

Subsequently, the lock mechanism 7 and the open and close control mechanism 8 will further be described with reference to the connection diagram of FIG. 20.

When the disc D is horizontally moved by the loading operation and this movement is completed, the completion of the movement of the disc D is detected by the switch S2 which is controlled by the optical switch 9. By this switch S2, the circuit of the planger 25 is turned off to cause the planger 25 to be set in the inoperative mode. Then, the disc D is moved downward and then loaded on the disc table. In this case, when the planger 25 is changed in mode to be inoperative, the operation plate 23 is returned to the original position and the rotational movement of the lid opening lever 27 is released so that the openable and closable lid 6 is rotatably moved in the direction in which the lid 6 is closed, or in the lower direction in association with the return movement of the operation plate 23 and comes in contact with the upper plate 121d of the casing 111 of the disc D. While, when the casing 111 is taken out from the player 1A, the lower edge portion of the lid 6 comes into contact with the rear surface side of the upper edge of the lock plate 12 which was already returned upward. However, when the operation plate 23 is returned, the levers 21, 21' are respectively pushed again by the lower edge protruded portions 23c, 23c' through the engaging pins 22, 22' and swung downwards to thereby lower the lock plate 12 so that the openable and closable lid 6 is overshot through the lock plate 12 and then rotated to the front side. Under this state, when the lock plate 12 is released from being pushed down by overshooting the protruded portions 23b, 23b' of the operation plate 23 through the engaging protrusions 22, 22' of the levers 21, 21' and moved upward again, the engaging stepped portion 12a formed on the upper edge of the lock plate 12 is engaged with the lower edge of the openable and closable lid 6, thus the lid 6 being locked.

On the other hand, the disc D loaded on the disc table is pressed and held by a disc clamp (not shown) which is provided on a disc clamp arm (not shown). When the disc D is pressed and held by the disc clamp, the movable contact of the switch S3 which constructs the operation switch 10 is changed in position to the side of the alarm circuit 29, wherein an alarm lamp or buzzer (not shown) is operated to prevent the double loading of the disc D. Further, in this case, since the switches S2 and S3 are respectively turned off, even of the openable and closable lid 6 is pressed and the lock plate 12 is rotatably swung to thereby turn the switch S1 on, the planger 25 is not operated so that the lock plate 12 holds the openable and closable lid 6 in the locked state.

When the disc D is played in accordance with the above operation and the disc D is ejected from the disc player 1A after the playing is ended, an eject button is depressed to make the eject switch S4 on, whereby to operate the planger 25 thus the openable and closable lid 6 being opened similarly as above.

Under this state, the disc D is lifted up from the disc table and moved in the direction of the opening portion of the disc player 1A by the disc loading mechanism, or unloaded and inserted from the inside to the inner opening 3 of the insertion opening frame member 2. In this case, if the casing 111 is inserted into the insertion opening frame member 2, the disc D is inserted into this casing 111. Accordingly, as described above, when the unloading operation is completed, the unloading completion detection switch S5 which is logically controlled in cooperation with the optical switches 8a, 8b is turned off to set the planger 25 in the inoperative mode, thus the openable and closable lid 6 being closed.

Further, even when the rear end portion of the disc D is held between the openable and closable lid 6 and the lock plate 12 due to the deviation in timing of the lid closing operation, the lid 6 merely comes into contact with the disc D by its own weight. Also, since the upper edge end surface of the lock plate 12 is formed only as a concave and curved shape, the upper edge end surface of the lock plate 12 merely contacts with the peripheral edge of the disc D and never damages the recording surface of the disc D.

In the above operation, when the casing 111 is inserted upside down into the insertion opening frame member 2 of the disc player 1A, or erroneously inserted thereinto, the front edge end of the upper plate 121c of the outer casing 121 comes into contact with the lower side front surface of the insertion opening frame member 2, namely, the erroneous insertion preventing stepped portion 123 of the casing 111 and the erroneous insertion preventing stepped portion 4 of the insertion opening frame member 2 are made in contact with each other so that the front end portion of the inner casing 122 never reaches the predetermined position. Then, an insertion detecting switch (not shown) is disposed at this predetermined position, wherein when the casing 111 is inserted upside down into the insertion opening frame member 2 of the disc player 1A, on the basis of logical output of the fact that the tip end of the disc D never reaches the optical switch 8a and this insertion detecting switch, the loading of the disc D by the motor 51 and the planger 61 is inhibited.

Furthermore, when the casing 111 is once taken out from the insertion opening frame member 2 before the playback of the disc D is ended or when upon loading, the disc D is taken out from the casing 111, inserted into the insertion opening frame member 2 directly by hand for loading and thereafter the casing 111 which is being upside down is inserted thereinto, on the basis of the logical outputs derived from the detecting switch 10 which detects whether the disc D is loaded on the disc table and the insertion detecting switch, the unloading of the disc D by the motor 51 and the planger 61 is inhibited.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A disc player comprising a housing having a front wall with an elongated opening extending laterally thereacross for insertion of a disc therethrough into said housing; a spindle motor in said housing connected to a rotatable disc table disposed horizontally at a level below said elongated opening; a pair of upper and lower rollers extending laterally within said housing between said front wall and said disc table, said upper roller being disposed at a level above said elongated opening so as to be engageable from above with a disc inserted through said opening, said lower roller being disposed below said upper roller, each of said upper and lower rollers having relatively large diameter end portions at the opposite ends thereof and tapering gradually from said large diameter end portions to a relatively small diameter portion centered therebetween; means mounting said lower roller for substantially vertical movement and being biased upwardly for normally urging said lower roller against said upper roller at said end portions thereof so that a disc inserted through said opening is engaged from above and below, at the periphery of the inserted disc, by said upper and lower rollers, respectively, so long as said lower roller is free to be normally urged upwardly; drive means for rotating said lower roller in a direction to cause the inserted disc engaged by said upper and lower rollers to be displaced therebetween to a position centered over said disc table; stop means limiting the movement of the disc by said upper and lower rollers at said position centered over the disc table; and means powered by said drive means in response to engagement of a disc with said stop means for moving said lower roller downwardly to a position below said level of the disc table for depositing the disc on said disc table, said drive means continuing to rotate said lower roller during the downward movement thereof for ensuring maintenance of the centered relation of the disc to said table.

2. A disc player according to claim 1; further comprising a second pair of upper and lower rollers disposed in said housing between the first mentioned upper and lower rollers and said front wall, said second upper roller being rotatable about a fixed axis at the same level as said first upper roller and said second lower roller being disposed below said second upper roller, and means mounting said second lower roller for substantially vertical movements in synchronism with the vertical movements of said first lower roller so that, during the downward movement of said first lower roller for depositing the disc on said disc table, the disc is maintained substantially horizontal on said first and second lower rollers.

3. A disc player according to claim 1; in which said lower roller includes a shaft connected with said drive means, and a roller body extending around said shaft and frictionally coupled thereto so that said shaft rotated by the drive means can slip relative to said roller body upon excessive resistance to rotation of the latter.

4. A disc player according to claim 3; in which at least a peripheral surface portion of said roller body is of a resilient material.

5. A disc player according to claim 1; in which said means mounting said lower roller includes pivoted support plates in which the opposite ends of said lower roller are journalled and spring means urging said pivoted support plates upwardly; said drive means includes a motor mounted on one of said support plates, and gear transmission means for effecting rotation of said lower roller from said motor; and said means for moving the lower roller downwardly includes a pinion on said one support plate driven by said gear transmission, a gear rack movable between an engaged position meshing with said pinion to cause pivoting of said support plates in the direction moving said lower roller downwardly and a disengaged position spaced from said pinion, and actuating means responsive to engagement of the disc with said stop means for moving said gear rack from said disengaged position to said engaged position.

6. A disc player according to claim 5; in which said actuating means includes spring means urging said gear rack to said engaged position, electromagnetic means energized for moving said gear rack to said disengaged position, and means to prevent movement of said gear rack to said disengaged position in the course of said downward movement of said lower roller.

7. A disc player according to claim 6; in which said means to prevent movement of said gear rack to said disengaged position includes a guide groove in said gear rack, and a guide pin fixed on said one support plate and slidable along said guide groove, said guide groove having an entry portion in which said guide pin resides when said lower roller engages said upper roller, said entry portion of the guide groove being shaped to permit movements of said gear rack between said engaged and disengaged positions only when said guide pin engages in said entry portion of the guide groove.

8. A disc player according to claim 1; further comprising a lid pivotally mounted in back of said front wall for movements between opened and closed positions in respect to said elongated opening, lock means for securing said lid in said closed position while permitting limited movements of the lid in said closed position in response to the pressure against said lid of a disc being inserted through said elongated opening, and means responsive to said limited movements of the lid for displacing the latter from said closed position to said opened position.

9. A disc player according to claim 8; in which said means for displacing the lid includes switch means actuated in response to said limited movements of the lid, and electromagnetic means energized in response to actuation of said switch means for displacing said lid to said opened position.

10. A disc player according to claim 1; in which said disc is provided with a storage container including a receptacle portion having a resilient mouth section from which a substantial part of the disc projects and a cover portion engageable with said mouth section to complete the enclosure of the disc in said storage container and being removable from said mouth section to expose said substantial part of the disc for insertion in said elongated opening of the housing; and further comprising means at said elongated opening of the housing engageable with said resilient mouth section of the receptacle portion to distort said mouth section away from the opposed faces of the disc while the latter is being withdrawn from said receptacle portion by said rollers.

11. A disc player according to claim 10; in which said mouth section has an elongated cross-section which is longer than the diameter of the disc, and said means to distort the mouth section includes a rim structure around said elongated opening at the outside of said front wall, said rim structure bearing inwardly against the opposite ends of said elongated cross-section to make said mouth section bulge open when inserted in said rim structure.

* * * * *